United States Patent [19]

Bailey

[11] Patent Number: 4,602,528

[45] Date of Patent: Jul. 29, 1986

[54] APPARATUS FOR CONTROLLING TRANSMISSION GEAR SHIFT SELECTION

[76] Inventor: Timothy M. Bailey, 312 Beechwood Dr., Westfield, Ind. 46074

[21] Appl. No.: 725,991

[22] Filed: Apr. 22, 1985

[51] Int. Cl.⁴ ............................................. B60K 41/04
[52] U.S. Cl. ........................................ 74/861; 74/866
[58] Field of Search ............. 74/861, 865, 866, 336 R, 74/856, 857

[56] References Cited

U.S. PATENT DOCUMENTS

| | | | |
|---|---|---|---|
| 3,795,157 | 3/1974 | Campbell et al. | 74/879 |
| 3,937,106 | 2/1976 | Smith | 74/857 |
| 4,026,168 | 5/1977 | Kobayash | 74/857 |
| 4,077,283 | 3/1978 | Hammond | 74/860 |
| 4,155,277 | 5/1979 | Minami et al. | 74/866 |
| 4,217,795 | 8/1980 | Sugasawa et al. | 74/858 |
| 4,226,141 | 10/1980 | Espenschied | 74/858 |
| 4,289,100 | 9/1981 | Kinugawa et al. | 123/339 |
| 4,290,323 | 9/1981 | Gospodar | 74/860 |
| 4,338,832 | 7/1982 | Pelligrino | 74/866 |
| 4,401,073 | 8/1983 | Furuhashi | 123/339 |
| 4,411,174 | 10/1983 | Yokoi et al. | 74/861 |

FOREIGN PATENT DOCUMENTS 0018839 1/1982 Japan ............................... 192/4 A Primary Examiner—Lawrence J. Staab
Assistant Examiner—Martin G. Belisario
Attorney, Agent, or Firm—Woodard, Weikart, Emhardt & Naughton

[57] ABSTRACT

In an automotive engine, an apparatus for changing the shift position of the gear shift lever for an automatic or semi-automatic transmission from a first drive position to a second drive position automatically when the engine reaches a preselected rotational speed sensed by an engine RPM speed sensor. The apparatus includes a cut-out switch to automatically disable the apparatus once the gear shift lever has been shifted to the second drive position and a manually operable disconnect switch to disable the apparatus when automatic shifting of the gear shift lever is not desired.

9 Claims, 1 Drawing Figure

APPARATUS FOR CONTROLLING TRANSMISSION GEAR SHIFT SELECTION

BACKGROUND OF THE INVENTION

Thr present invention relates generally to the field of devices for controlling transmission gear shift selection and, more specifically, to such devices which effect gear shift change based upon engine rotational speed (RPMs).

Automotive vehicles equipped with automatic or semi-automatic transmissions are typically equipped with a manually operable gear shift selection lever which permits the operator to place the vehicle in various operational modes, such as forward, reverse, neutral and park. Usually, in the forward drive mode, there are at least two or three drive settings. While vehicles having fully automatic transmissions can be driven without further manual shifting by selecting the highest drive setting, the lower drive positions allow the operator to use lower gear ratios which provide improved performance when unusual road or load conditions are encountered.

Some drivers, however, also use the lower shift positions in accelerating the vehicle from a stopped or nearly stopped position in a manner similarly to fully manual gear shifting. Thus, such a driver will start in the lowest drive position and successively shift to the second lower and highest drive positions as vehicle speed is increased. This manner of driving is also employed by race car drivers, notably dragsters.

In drag racing, automatic or semi-automatic transmissions are employed because they reduce the time needed to shift gears by eliminating manual clutching. Obviously, in order to win at drag racing, the driver must be able to initiate gear shiftig at the precise moment the optimal engine RPM speed is attained. While a tachometer gauge is provided to assist the driver in determining when to shift, the gauge can give somewhat false readings due to vehicle vibrations.

In order to further aid the drag racing driver in shifting at the right time, and indicator light is often provided which signals when the dirver should initiate the next gear shift. Obviously however, there is a significant time lapse corresponding to the driver's reaction time which is undesirable. While the indicator light can be made to compensate for the dirver's reaction time, this reaction time is not constant and therefore cannot be precisely compensated. In any event, the driver must take one hand off the steering wheel to initiate a change in gears, and must also take his eyes off the road to monitor the tach and indicator light. This is undesirable from the standpoint of insuring a proper course and control of the vehicle.

SUMMARY OF THE INVENTION

An apparatus for use in an automotive engine having an electrical power source and an automatic or semi-automatic transmission including a manually operated transmission gear shift lever having at least two forward drive positions, according to one embodiment of the present invention comprises a speed sensing means for sensing the rotational speed of the engine and generating an output signal when the engine reaches a preselected rotational speed. There is also provided a gear shifting means for changing the shift position of the gear shift lever from a first drive position to a second drive position automatically in response to the output signal from the speed sensing means. The gear shifting means includes a latch movable between open and closed positions, a normally de-energized solenoid having a plunger connected to the latch and operable to move the latch to the open position when the solenoid is energized by the electrical power source, a relay means for allowing the energizing of the solenoid by the power source in response to the output signal from the speed sensing means, and an actuating means for actuating the movement of the gear shift lever from the first drive position to the second drive position in response to movement of the latch from the closed to the open position. The actuating means includes a spring biased linkage mechanism connected to the gear shift lever and a spring operably connected to the latch. The linkage mechanism is operable to move the gear shift lever from the first drive position to the second drive position when the engine reaches the preselected rotational speed.

Accordingly it is an object of the present invention to provide an improved apparatus for automatically controlling upshifting of gear selection positions for an automatic or semi-automatic transmission.

It is a further object of the present invention to provide an improved apparatus for automatically advancing the gear shift lever for an automatic or semi-automatic transmission between successive drive positions in response to the engine reaching a preselected rotational speed.

Further objects and advantages of the present invention will become more apparent by reference to the following FIGURES and detailed description.

DESCRIPTION OF THE PREFERRED EMBODIMENT

Figure 1:
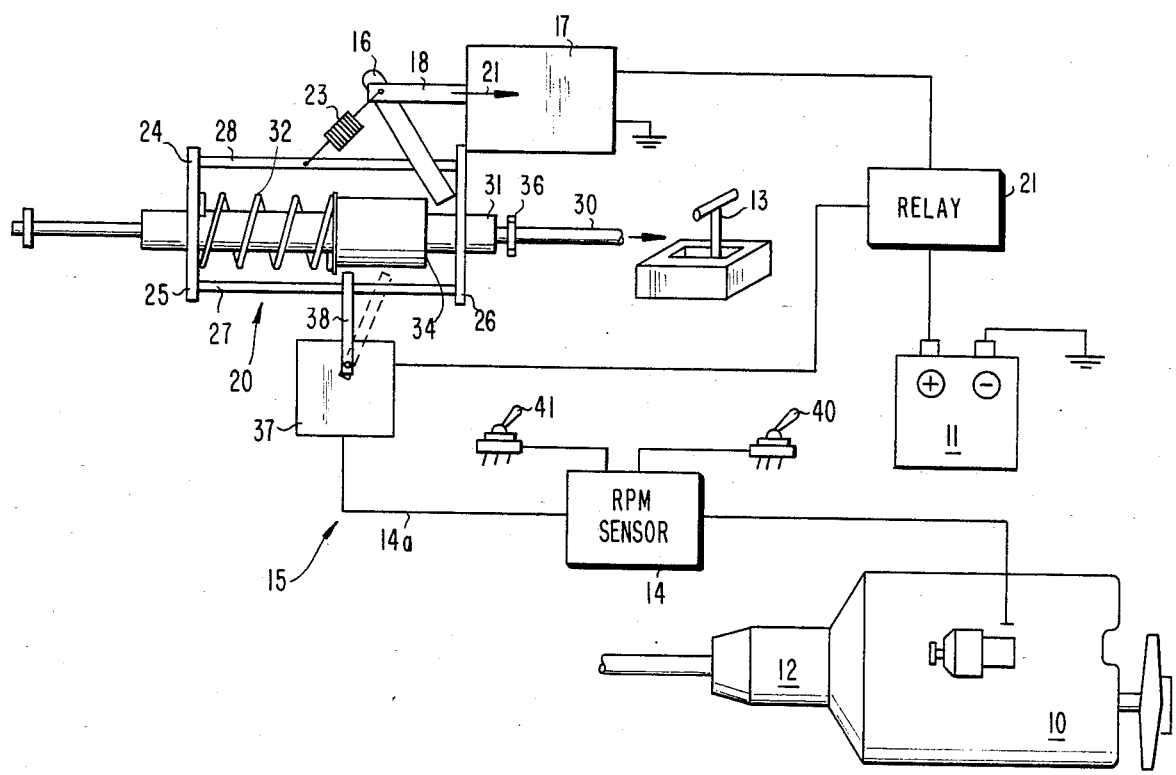
FIG. 1 is a diagrammatic view showing a two speed preferred embodiment of the apparatus according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the reference numeral 10 designates an automotive engine having an electrical power source 11 and an automatic or semi-automatic transmission 12 to which is connected a manually operated transmission gear shift lever 13 having at least two forward drive positions.

In the present invention, an engine RPM sensor 14 senses the rotational speed of engine 10, as derived from signals produced by the engine ignition coil, and generates an analog electrical signal representative of the actual detected rotational speed of engine 10. The level of the signal from sensor 14 is then compared with a preselected reference signal corresponding to the desired engine speed to be attained to initiate a gear shift. When the level of the signal from sensor 14 matches the preselected reference signal, sensor 14 generates a shift signal on line 14a.

A gear shifting means, generally designated at 15, changes the shift positin of gear shift lever 13 from a lower forward drive position to a higher forward drive position automatically in response to a shift signal generated from RPM sensor 14. Gear shifting means 15 generally includes a latch 16 movable between open and closed positions, a normally de-energized solenoid 17 having a plunger 18 operable to open latch 16, and an actuating mechanism 20 operable to upshift gear shift lever 13 upon opening of latch 16.

The generating of a shift signal on line 14a actuates the closing of a normally open relay 21 connected between normally de-energized solenoid 17 and electrical power source 11, which may be a car battery. Closing of relay 21 permits electrical current to flow from power source 11 through relay 21 to energize solenoid 17. The solenoid 17 includes a plunger 18 which is pivotally connected to a latch 16 that is spring biased towards its closed position by spring 23. Upon solenoid 17 being energized by power source 11, plunger 18 actuates within the solenoid (in the direction of arrow 21) and causes latch 16 to pivot, against the urging of spring 23, to its open position.

Actuating mechanism 20 includes a rigid frame 24 fixedly mounted relative to the gear shift lever 13. Frame 24 is comprised of a pair of plates 25 and 26 separated by supports 27 and 28. A lost motion linkage rod 30 is slidably received within a collar 31 in turn slidably supported within frame 24 and guided within holes in plates 25 and 26. Linkage rod 30 may be directly connected to gear shift lever 13 or to the linkage between lever 13 and the engine transmission.

As seen in FIG. 1, collar 31 is normally urged to the right by a spring 32. Pivoting of latch 16 to its open position releases collar 31 to slide rightwardly, under urging from spring 32, until movement is stoppd by contact of shoulder 34 on collar 25 against plate 26. The right end of collar 31 urges against a nut 36 threadably received on lost motion linkage rod 30 and thereby moves the rod 30 and shift lever 13. When the shift lever 13 is positioned in the park, neutral or reverse positions the nut 36 on rod 30 will be positioned sufficently to the right so that even if a shift signal causes the opening of latch 16, rod 30 will not be urged by collar 31 to shift gear shift lever 13.

Once the gear shifting means 15 has been actuated to upshift gear shift lever 13, it cannot again be actuated by a shift signal from RPM sensor 14 until the gear shift lever 13 is manually downshifted into the lower drive position. Such movement of gear shift lever 13 causes collar 31 to be moved to the left, against the urging of spring 32, under urging from nut 36. Collar 31 is moved sufficiently to the left to permit latch 16 to close by pivoting into the space between shoulder 34 and plate 26 under urging from spring 32.

A cut out switch 37 is connected between RPM sensor 14 and relay 21 and operates to disconnect sensor 14 from relay 21 once the gear shift lever 13 is upshifted by movement of rod 30. A spring biased lever arm 38 on cut out switch 37 detects the position of collar 31 and opens switch 37 when collar 31 moves rightwardly upon being released by latch 16. Cut out switch 37 will not close again until the shift lever 13 has been manually downshifted to the lower drive position. Thus, if a shift signal is again generated from RPM sensor 14, the signal will not proceed to relay 21, which will stay open and will not energize solenoid 17.

A manually operable disconnect switch 40 allows the shift signal generated from RPM sensor 14 to be manually disconnected from the remainder of the circuitry so that gear shift lever 13 can be manually operated in the usual fashion, if desired.

Gear gear shifting means 15 further includes a manually operable test switch 41 for generating a test output signal, independent of RPM sensor 14, to actuate the actuating mechanism 20.

Several advantages of the present invention should now be apparent. First, under or over revving of the engine, a common problem in manual shifting, is eliminated. Second, the driver has both hands free for use on the steering wheel. Further, the driver does not have to monitor a tachometer or shift indicator light. In addition, the invention can be manually overrided to shift sooner than the preselected RPM shifting level, or manually hold it to shift later or may be totally disabled by simply throwing a switch to allow full manual shifting.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. Thus, for example, while the described invention is suited for use with a transmission having two forward drive positions, it should be obvious that the invention may be suitably modified for use with transmissions having three or more forward drive positions to effect a series of up shifts at the corresponding optimal engine RPM speed for each shift.

What is claimed is:

1. In an automotive engine having an electrical power source and an automatic or semi-automatic transmission including a manually operated transmission gear shift lever having at least two forward drive positions, an apparatus comprising:

(a) a speed sensing means for sensing the rotational speed of said engine and generating an output signal when said engine reaches a preselected rotational speed; and (b) a gear shifting means for changing the shift positions of said gear shift lever from a first drive position to a second drive position automatically in response to said output signal from said speed sensing means, said gear shifting means including (i) a latch actuable between open and closed positions, (ii) a normally de-energized solenoid having a plunger connected to said latch and operable to move said latch to said open position when said solenoid is energized by said electrical power source, (iii) a relay means for allowing the energizing of said solenoid by said power source in response to said output signal from said speed sensing means, and (iv) an actuating means, including a spring biased linkage mechanism operably connected to said gear shift lever and said latch, for actuating the movement of said gear shift lever from said first drive position to said second drive position in response to movement of said latch from the closed to the open position, thereby causing gear shifting to occur when said engine reaches said preselected rotational speed.

2. The apparatus of claim 1 wherein said linkage mechanism in said actuating means is a lost motion linkage.

3. The apparatus of claim 1 wherein said shifting means further includes a cut-out switch responsive to the position of said linkage mechanism to disconnect the output signal of said speed sensing means from said relay when said gear shift lever is in said second drive position.

4. The apparatus of claim 1 wherein said shifting means further includes a manually operable disconnect switch means for disconnecting said speed sensing means output signal from said relay means.

5. The apparatus of claim 1 wherein said gear shifting means further includes a manually operable test switch means for generating a test output signal, independent of said speed sensing means, to actuate said actuating means.

6. The apparatus of claim 1 wherein said actuating means includes a normally open relay operably connected to said speed sensing means and said solenoid, said relay closing in response to said output signal from said speed sensing means thereby permitting said power source to energize said solenoid.

7. The apparatus of claim 2 wherein said shifting means further includes a manually operable disconnect switch means for disconnecting said speed sensing means output signal from said relay means.

8. The apparatus of claim 7 wherein said gear shifting means further includes a manually operable test switch means for manually generating a test output signal, independent of said speed sensing means, to actuate said actuating means.

9. The apparatus of claim 8 wherein said actuating means includes a normally open relay operably connected to said speed sensing means and said solenoid, said relay closes in response to said output signal from said speed sensing means thereby permitting said power source to energize said solenoid.

* * * * *